April 3, 1962 H. M. AUSTENSON 3,028,132

TREE STAND

Filed March 13, 1961

INVENTOR.
Herman M. Austenson
BY T W Secrest

United States Patent Office 3,028,132
Patented Apr. 3, 1962

3,028,132
TREE STAND
Herman M. Austenson, Sumner, Wash.
(2420 46th Ave. NE., Puyallup, Wash.)
Filed Mar. 13, 1961, Ser. No. 95,225
4 Claims. (Cl. 248—44)

This invention relates to a tree stand and, more particularly, to a stand which may be used for supporting trees for decorative purposes.

There are commercially available a number of different tree stands. One of these comprises a cup-like base for receiving the bottom of the trunk of the tree, and pivoted to this base at equiangular positions are three legs. The lower ends of these legs rest on the floor so as to raise the cup off of the floor and the upper ends of the legs have claws so as to bite into the trunk of the tree and thereby position the same.

A second type of tree stand comprises a cup for receiving the base of the tree. There are three legs attached in equiangular position to this cup and which legs raise the cup off of the floor. Superimposed above the cup, but attached to the same, is a ring through which the trunk of the tree projects. Around the ring are three setscrews so as to position the trunk of the tree inside the ring.

In theory, and by looking at Christmas tree stands on display, the purchaser would assume that they would serve the purpose of holding a Christmas tree in an upright position. However, these supports suffer a shortcoming in that they do not maintain the Christmas tree in the upright position. More particularly, there is only one position on the trunk of the tree that is firmly positioned by the Christmas tree stand. This is where the screws bear against the trunk of the tree or the claws bear against the trunk of the tree. As a result the tree leans. In extreme cases a tree may lean so much that it will topple over. To guard against the tree's leaning and toppling, it is necessary to brace the tree by guide wires and the like.

As a result of these experiences with commercially available Christmas tree stands, I have invented a stand which provides a good support for a tree and which will not readily tip over; a stand in which it is possible to readily position or place the tree, either by a man or a woman or an older child; a stand which is adapted to be readily camouflaged by boughs and cloth; a stand which can be easily manufactured from readily available materials; and, a stand which is so inexpensive that it may be discarded and replaced the following year with a similar stand.

These and other advantages of my invention will be more particularly brought forth upon reference to the accompanying drawing, the detailed specification of the stand and the appended claims.

Figure 4:
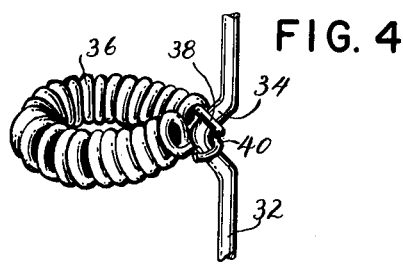

FIGURE 4, on an enlarged scale, illustrates a clasping means for holding the tree to the stand.

Figure 5:
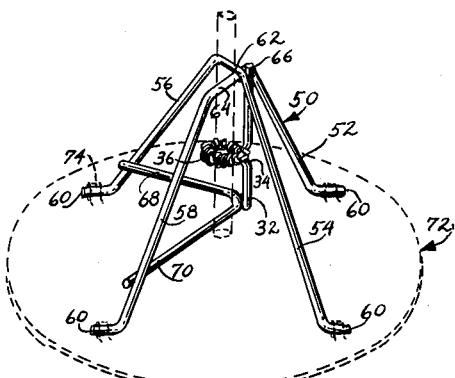
Figure 6:
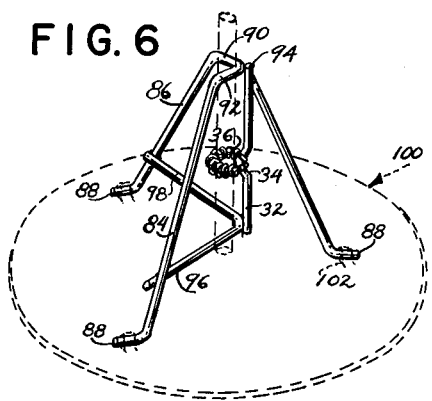

FIGURE 5 is a perspective view looking down on a four-leg version of the stand and illustrates, in phantom, the stand in a pan for supporting purposes; and, FIGURE 6 is a perspective view looking down on a three-leg version of the stand and illustrates, in phantom, the stand in position in the pan for supporting purposes.

Referring to the drawings it is seen that the invention comprises a Christmas tree stand 10 having a circular peripheral band 12. The ends of the band 12 may be welded at 14 to form a circle. In place of the butt welding at 14 the ends may be lap welded.

The stand comprises three upwardly and inwardly directed legs 16, 18 and 20. The lower ends of the legs 16, 18 and 20 are welded to the peripheral band 12.

The legs 18 and 20 at their upper part bend inwardly to form fingers 22 and 24. These fingers 22 and 24 terminate at approximately the center of the circular band 12 and are welded together at 26. The leg 16 is also welded to the inner ends of the fingers 22 and 24 at 26 to form a rigid, unitary structure. The angle formed by the fingers 22 and 24 may be one of many angles, but I have found a preferably angle to be approximately 60°. These fingers 22 and 24 thus form an open-sided pocket for receiving the trunk of a tree. The legs 16, 18 and 20 may be equiangularly positioned with respect to the peripheral circle 12 or may be at angles approximately 120° with respect to each other.

Between the peripheral circle 12 and the fingers 22 and 24 there is positioned an angular brace comprising angles 28 and 30 forming a second pocket. The angle 28 connects with the leg 20 and the angle 30 connects with the leg 18. Actually, the angular brace comprising the angles 28 and 30 is positioned closer to the peripheral circle 12 than to the fingers 22 and 24. Running between the inner ends of the fingers 22 and 24 and 26 and the inner ends of the agles 28 and 30 is a bracing bar 32. This bracing bar interconnects the leg 16, the fingers 22 and 24, and the angular braces 28 and 30.

In the bracing bar 32 is a crimp or angle 34. Attached to this crimp or angle 34 is a coil spring 36. One way of attaching the spring is welding one end of the spring 38 to the crimp 34. The spring 36 on its free end has a hook 40 for hooking around the crimp 34.

In use the trunk 42 of the tree is placed in position substantially parallel to the bracing bar 32 with the lower end of the trunk projecting below the angle braces 28 and 30 and between said angle braces and the trunk also between the fingers 22 and 24. The coil spring 36 or clasping means 36 is wrapped around the trunk 32 when the hook 40 is hooked in the crimp 38. It may be desirable, from the standpoint of prolonging the life of the Christmas tree so that the needles will not fall, to place a reservoir of water around the base of the tree. This water reservoir may be a plastic bag 44. The bag 44 surrounds the lower end of the trunk 42 and is filled with water. The bag may be attached by a tie string 46.

In FIGURE 5 there is illustrated a four-leg version of this stand but which version does not have a peripheral circular band attached to the legs. The stand in FIGURE 5 is referred to by reference numeral 50 and comprises four upwardly directed and inwardly directed legs 52, 54, 56 and 58. The lower end of each of these legs terminates in a foot 60.

The legs 56 and 58 in their upper part are directed inwardly to form fingers 62 and 64. The fingers 62, united at their inner ends, are tack welded together at 66. The legs 52 and 54 at their upper and inner ends also unite with the fingers 62 and 64 at 66. Interconnecting the two legs 56 and 58, and near the feet 60, are two angle braces 68 and 70. The angle braces 68 and 70 are directed inwardly and meet at approximately directly below the meeting place of the fingers 62 and 64. A vertical bracing bar 32 connects the angle braces 68 and 70 with fingers 62 and 64. The bracing bar 32 has previously been described and will not be described again. Attached to the crimp 34 and the bracing bar 32 is a coil spring 36 or a clasping means 36.

In use a trunk 42 may be positioned between the inner ends of the angle braces 68 and 70, substantially parallel to the bracing bar 32, and between the inner ends of the fingers 62 and 64. A coil spring 36 wraps around the trunk so as to position the same. The four legs are sufficient to support the tree and to prevent the tree from tipping over the stand. These legs define a circle of a sufficiently wide radius and, also, are positioned, approximately equiangularly with respect to each other, so as not to tip over. However, in certain instances it may be desirable to place the legs in a pan or the like for supporting purposes. Therefore, there may be used in conjunction with the stand 52 a pan 72. This pan 72 has four spaced-apart clips 74. These clips 74 may be tack welded to the upper surface of the bottom of the pan. The feet 60 co-fit with the clips 72 so as to attach the stand 50 to the pan 72. The pan 72 may have a raised lip so as to hold water in order to keep the Christmas tree moist and fresh.

In FIGURE 6 there is illustrated a three-leg version of the Christmas tree stand. This version is referred to by reference numeral 80 and comprises three upwardly directed legs 82, 84 and 86. The lower end of the leg terminates in an outwardly directed foot 88.

The legs 84 and 88 at their upper part are directed inwardly to form fingers 90 and 92. The fingers 90 and 92 meet at 94 and are tack welded together at this point. Also, the leg 82 is directed upwardly and inwardly and meets the fingers 90 and 92 and is tack welded to them at 94.

Joining the legs 84 and 86 is an angle brace comprising angles 96 and 98. The inner end of the angle brace comprising angles 96 and 98 is connected by a bracing bar 32 to the fingers 92 and leg 82 at 94. The bracing bar 32 has previously been described and will not be described at this point. However, as previously stated there is a crimp 34 in the bar 32 and a spring or clasping means 36 attached to this crimp. As previously stated, the trunk of the tree can be held in position between the fingers 92 and 94, the bracing bars 96 and 98, and substantially parallel to the bracing bar 32 by means of the spring 36 or clasp 36.

As is well-known from geometry, three points determine a plane. It is seen that the three feet 88 on the ends of the legs 84, 86 and 82 will determine the place of the stand. These feet 88 define a circle of sufficiently wide radius to support the stand and are also approximately equiangularly positioned with respect to each other. However, in certain instances it may be desirable to have the Christmas tree stand 80 in a pan 100. The pan 100 on its upper surface has a number of clips 102. These clips may be tack welded or spot welded to the upper surface of the pan. The feet 88 slide under the clips 102 and are positioned by them. The pan 100 may have elevated sides so as to hold water and thereby give water to the tree.

The tree stand may be made of wire or other suitable material. A satisfactory wire for this stand has been found to be a four-gauge or a six-gauge wire. Referring to the stand in FIGURES 1, 2 and 3 the outer ring 12 may have a diameter of approximately 12 to 24 inches and the vertical height of approximately 8 to 12 inches. The bracing angle comprising legs 30 and 28 may be approximately 2 to 6 inches from the bottom of the stand, measured vertically. A number of different fabricating techniques may be employed. For example, instead of the legs 18 and 20 being bent in their upward region and then directed inwardly and welded together, there may be employed one continuous wire and which wire is bent to the configuration shown. The bracing bar 16 may run from this wire to the outer ring 12. As previously stated, the angle between the fingers 22 and 24 may vary from approximately 60° to 90°, depending upon the particular design. The fingers 22 and 24 may vary for trees of a different size. The desirable length of these fingers may be from approximately one to three inches. The spring 36 or securing means 36 may be some other type of means such as an elastic band made of rubber or plastic or may be a type of spring other than a coil spring.

Figure 1:
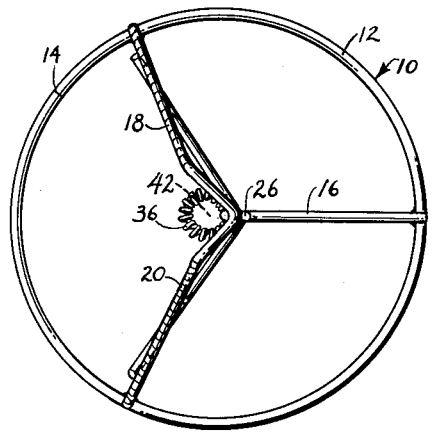
FIGURE 1 is a plan view looking down on a specific embodiment of the invention constructed in accordance with the preferred teachings thereof and illustrates, in phantom, the trunk of a tree in position in the stand.
Figure 2:
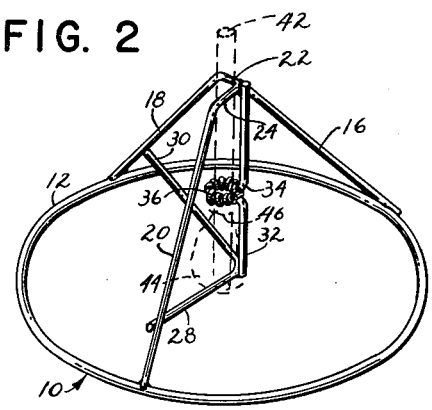
FIGURE 2 is a perspective view looking down on the stand and illustrates, in phantom, a tree in position in the stand and with a water reservoir comprising a resilient water bag surrounding the base of the tree.
Figure 3:
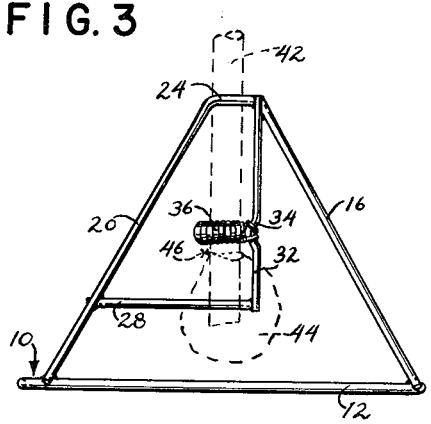
FIGURE 3 is a side elevational view of the stand and illustrates, in phantom, the trunk of the tree with the water bag surrounding the base of the trunk of the tree.

The above remarks in regard to the stand of FIGURES 1, 2 and 3 are also applicable to the stand as shown in FIGURES 5 and 6. More particularly, the diameter defined by the feet 60 in FIGURE 5 and the feet 88 in FIGURE 6 may be from 12 to 24 inches. If a pan is employed with the stands of FIGURES 5 and 6, the dimensions may vary somewhat so as to utilize the bracing factor of the large diameter of the pan. The legs 60 and 88 may be capped with relatively soft and substantially no abrasive material such as a plastic, rubber or wood. This is desirable when there is not employed a pan in conjunction with the stand, but instead the legs of the stand are resting on the floor.

Having presented my invention, what I claim is:

1. A stand for supporting a tree, said stand being of skeletal construction and comprising at least three upwardly and inwardly sloping leg means, two of said leg means having their upper parts bent and extending generally horizontally, said upper parts being joined to thereby provide a tree-receiving, open-sided pocket, means rigidly securing at least one other of said leg means to said two leg means, an angle brace rigidly connected with two of said leg means and extending generally horizontally at a level below said pocket, said brace having two parts defining an angle between them and forming a second tree-receiving, open-sided pocket vertically aligned with said first pocket, a generally vertically extending bracing bar disposed between said leg means and brace forming said pockets, means rigidly securing said bracing bar to said leg means and brace and clasping means carried by said bracing bar for engaging and holding a tree.

2. A stand for supporting a tree, said stand being of skeletal construction and comprising at least three upwardly and inwardly sloping leg means, two of said leg means having their upper parts jointed to thereby provide a tree-receiving, open-sided pocket, means rigidly securing at least one other of said leg means to said two leg means, an angle brace rigidly connected with two of said leg means and extending generally horizontally at a level below said pocket, said brace having two parts defining an angle between them and forming a second tree-receiving, open-sided pocket vertically aligned with said first pocket, a generally vertically extending bracing bar disposed between said leg means and brace forming said pockets, means rigidly securing said bracing bar to said leg means and brace and clasping means carried by said bracing bar for engaging and holding a tree.

3. The stand of claim 2, and a circular frame disposed at the lower ends of said leg means, and means connecting said leg means with said frame.

4. The stand of claim 2, and a pan disposed at the lower ends of said leg means and means connecting said leg means with said pan.

References Cited in the file of this patent
UNITED STATES PATENTS

| 1,590,910 | Rumrill | June 29, 1926 |
| 1,886,198 | Krueger | Nov. 1, 1932 |
| 2,703,213 | Zamierowski | Mar. 1, 1955 |
| 2,891,747 | Steede | June 23, 1959 |

FOREIGN PATENTS

| 8,312 | Great Britain | 1895 |